United States Patent [19]

Smith, Jr.

[11] Patent Number: 5,312,199

[45] Date of Patent: May 17, 1994

[54] SELF-ALIGNING JOINT FOR LINKAGES

[76] Inventor: Joseph E. Smith, Jr., 24 Newhall Rd., Hilton Head, S.C. 29928

[21] Appl. No.: 972,635

[22] Filed: Nov. 6, 1992

[51] Int. Cl.⁵ .......................... F16C 11/00; F16D 1/12
[52] U.S. Cl. ...................................... 403/79; 403/53; 403/119; 403/154
[58] Field of Search ............... 403/79, 157, 66, 40, 403/119, 150, 154, 113, 319, 59, 60, 53

[56] References Cited

U.S. PATENT DOCUMENTS

| | | | |
|---|---|---|---|
| 1,900,414 | 3/1933 | Ellberg et al. | 403/115 |
| 2,076,028 | 4/1937 | Hufferd | 403/131 |
| 2,133,913 | 10/1938 | Berger | 403/150 |
| 2,551,136 | 5/1951 | Keltner | 280/492 |
| 2,862,730 | 12/1958 | Berger | 403/59 |
| 2,885,235 | 5/1959 | Moskovitz | 403/131 |
| 2,953,401 | 9/1960 | Moskovitz et al. | 403/131 |
| 3,112,123 | 11/1963 | True | 280/95.1 |
| 3,290,073 | 12/1966 | Gottschald | 403/124 |
| 3,363,921 | 1/1968 | Gottschald | 403/130 |
| 3,391,953 | 7/1968 | Jordan | 403/355 |
| 3,391,955 | 7/1968 | Gottschald | 403/131 |
| 3,694,890 | 10/1972 | Arning et al. | 29/428 |
| 3,791,748 | 2/1974 | Goodrich et al. | 403/27 |
| 4,034,946 | 7/1977 | Zimmer, Jr. | 403/157 |
| 4,225,260 | 9/1980 | Gaines | 403/114 |
| 4,324,501 | 4/1982 | Herbenar | 403/133 |
| 4,332,500 | 6/1982 | Smith, Jr. et al. | 403/114 |
| 4,334,795 | 6/1982 | Westphal | 403/131 |
| 4,358,211 | 11/1982 | Goodrich et al. | 403/27 |
| 4,629,352 | 12/1986 | Nemoto | 403/128 |
| 4,949,590 | 8/1990 | Barker et al. | 74/512 |

*Primary Examiner*—P. Austin Bradley
*Assistant Examiner*—Rex E. Pelto
*Attorney, Agent, or Firm*—Krass & Young

[57] ABSTRACT

A self aligning joint and linkages employing the self aligning joint. The joint includes a stem; a clevis mounted for rotation on one end of the stem and defining a pair of spaced arms; a stud having a circumferential groove proximate one end thereof; a body member positioned between the clevis arms and defining a socket mounting the one end of the stud for rotation about the axis of the stud; and an axle pin mounted at opposite ends in the clevis arm, passing through the body member to mount the body member for angulation about the pin axis, and including an intermediate portion positioned in the stud groove to preclude axial displacement of the stud out of the socket. Also disclosed are linkages including an elongated tubular member, an elongated rod member mounted for rotation in the tubular member and including a free end projecting out of one end of the tubular member, a self aligning joint according to the invention secured to the free end of the rod member, and a further self aligning joint secured to the end of the tubular member remote from the rod member. The self aligning joints in this case are "zero angle" joints providing only two degrees of movement with the third movement being provided in each case by relative rotation between the tubular member and the rod member.

18 Claims, 7 Drawing Sheets

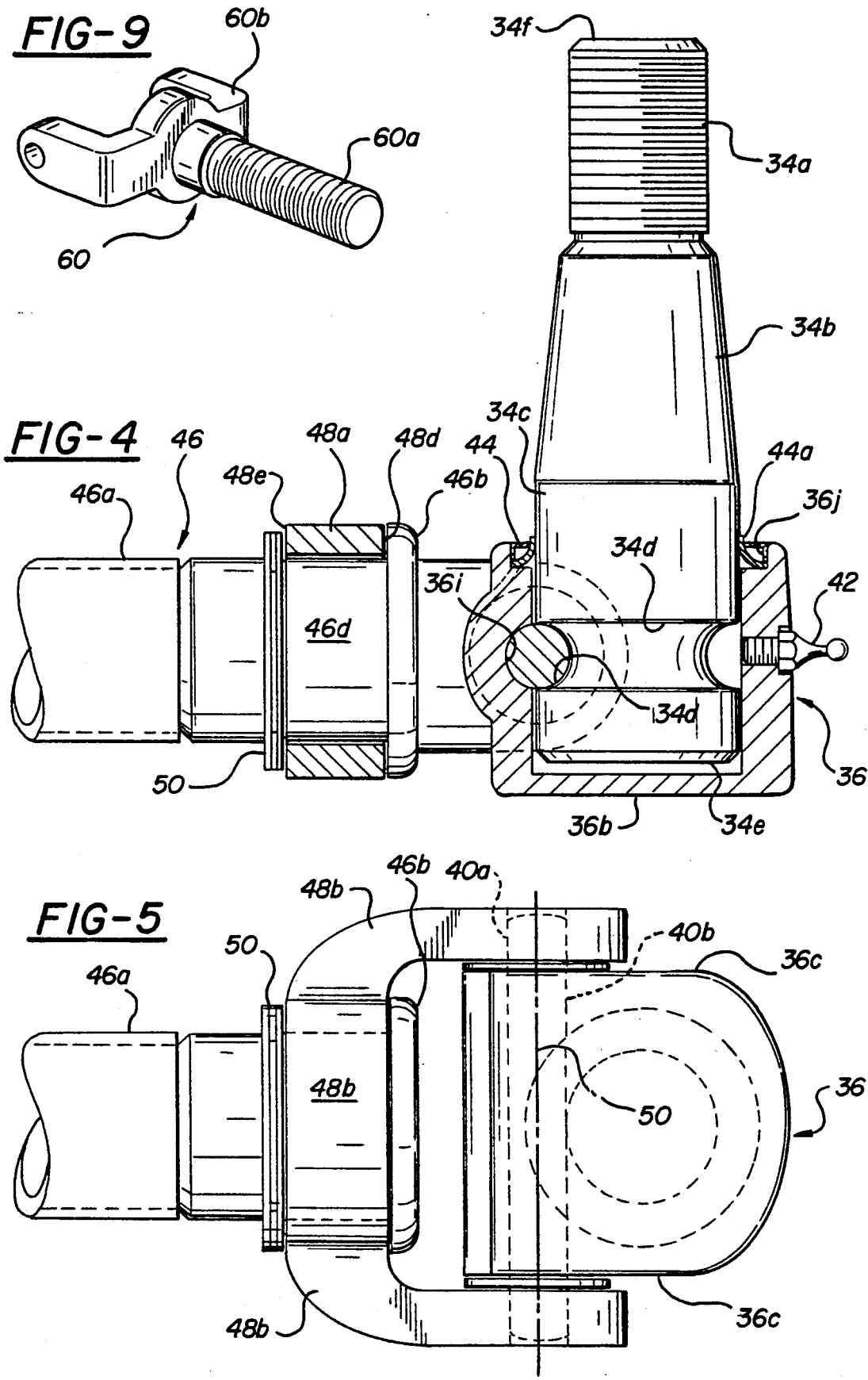

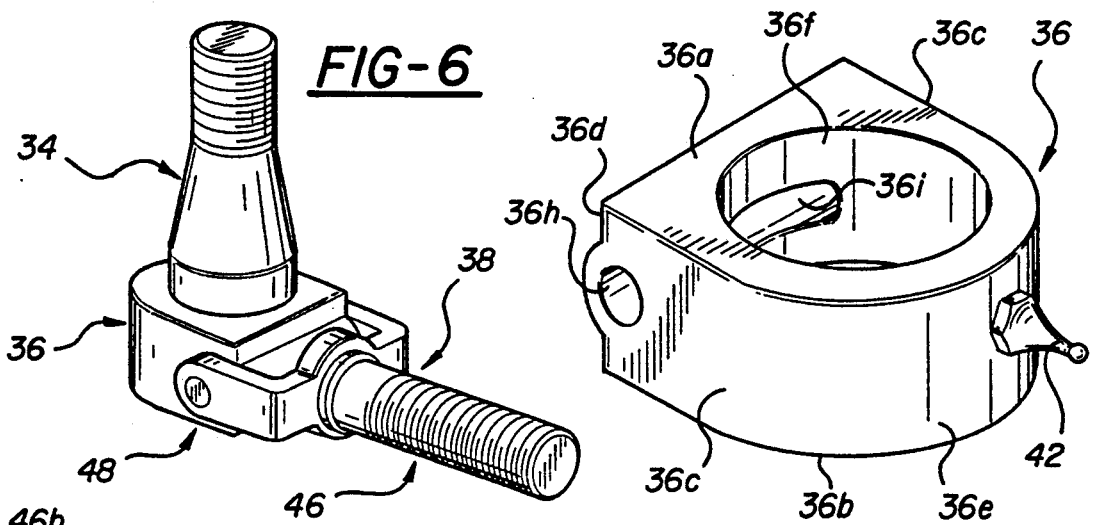
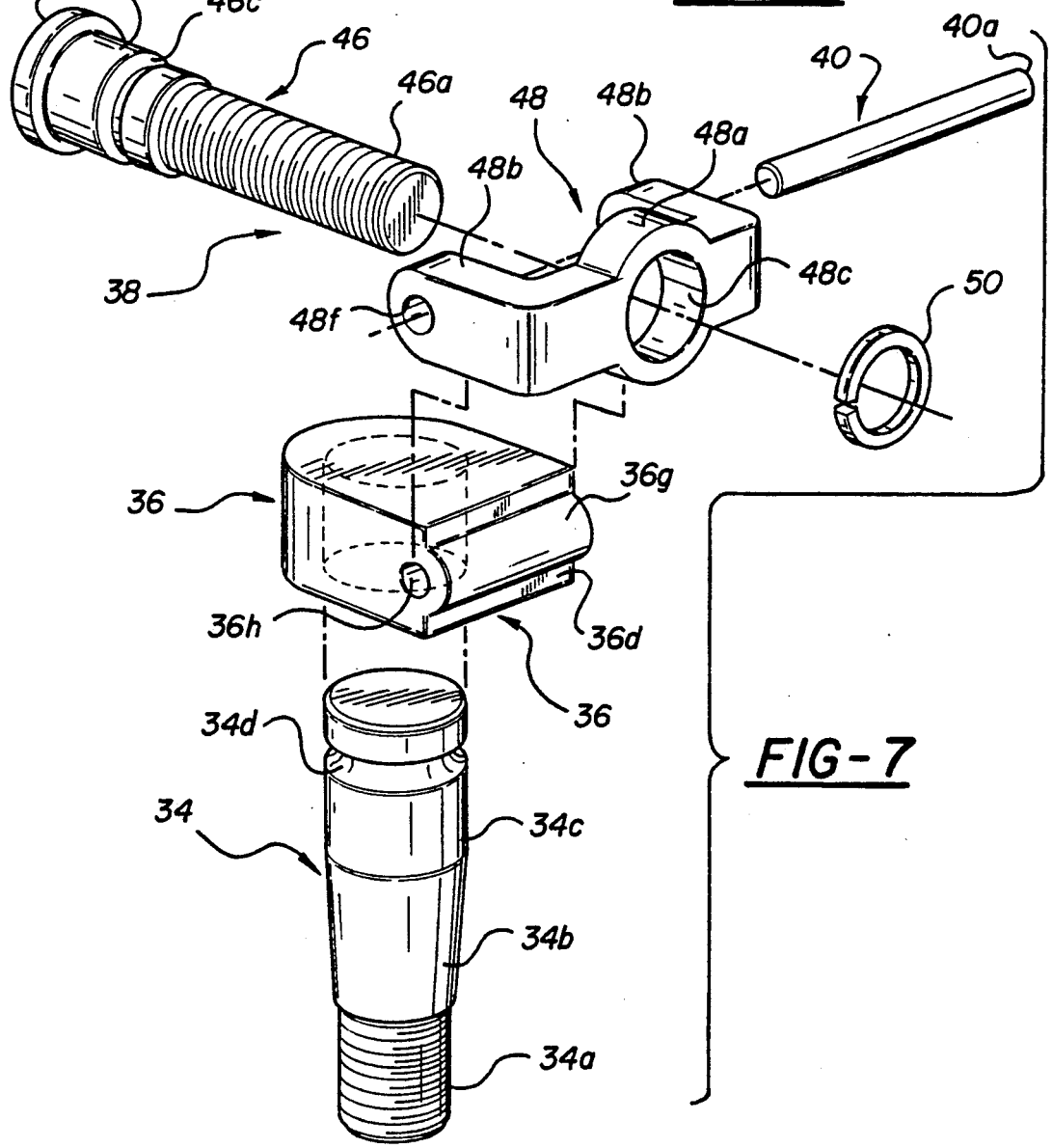

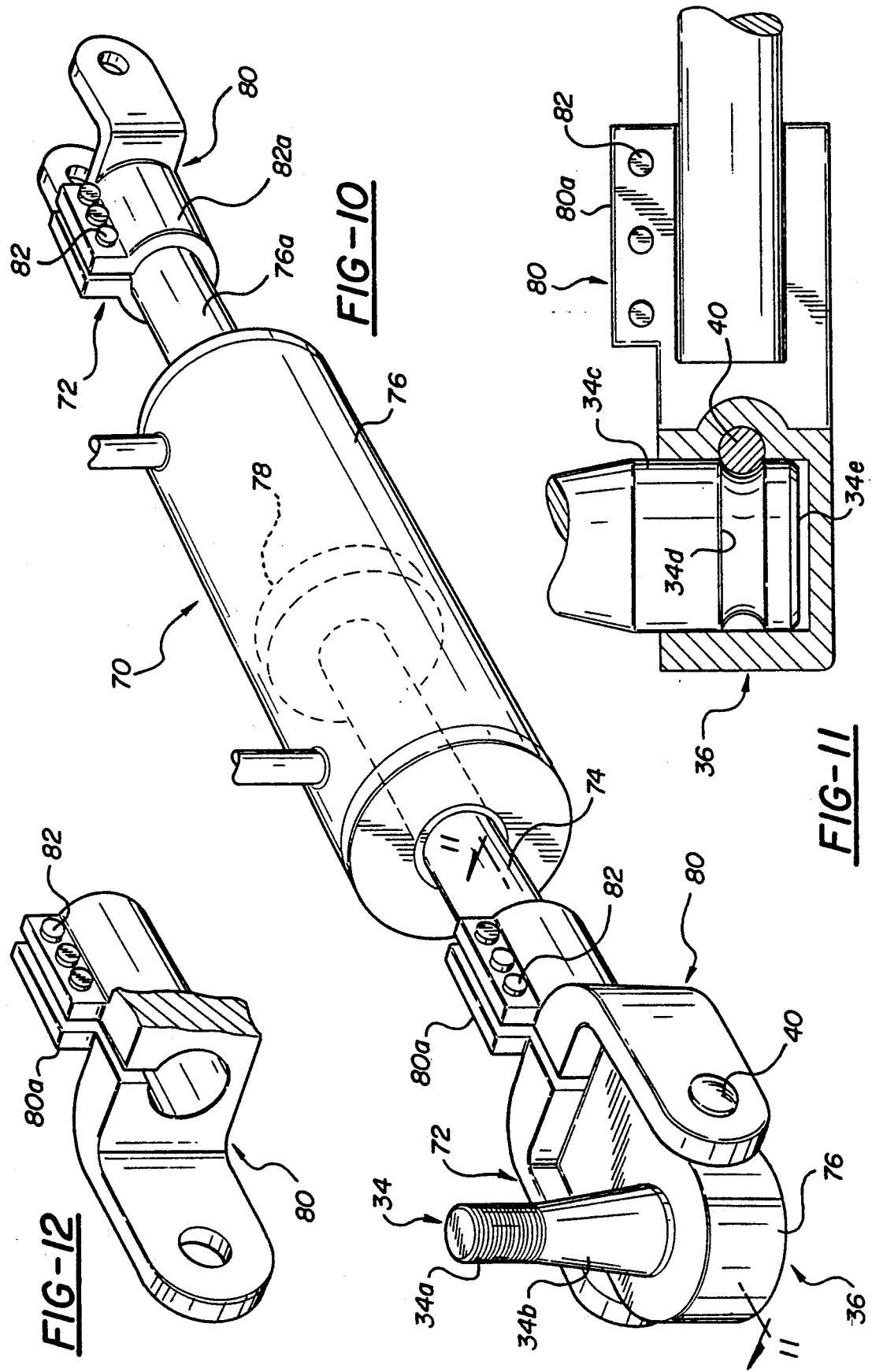

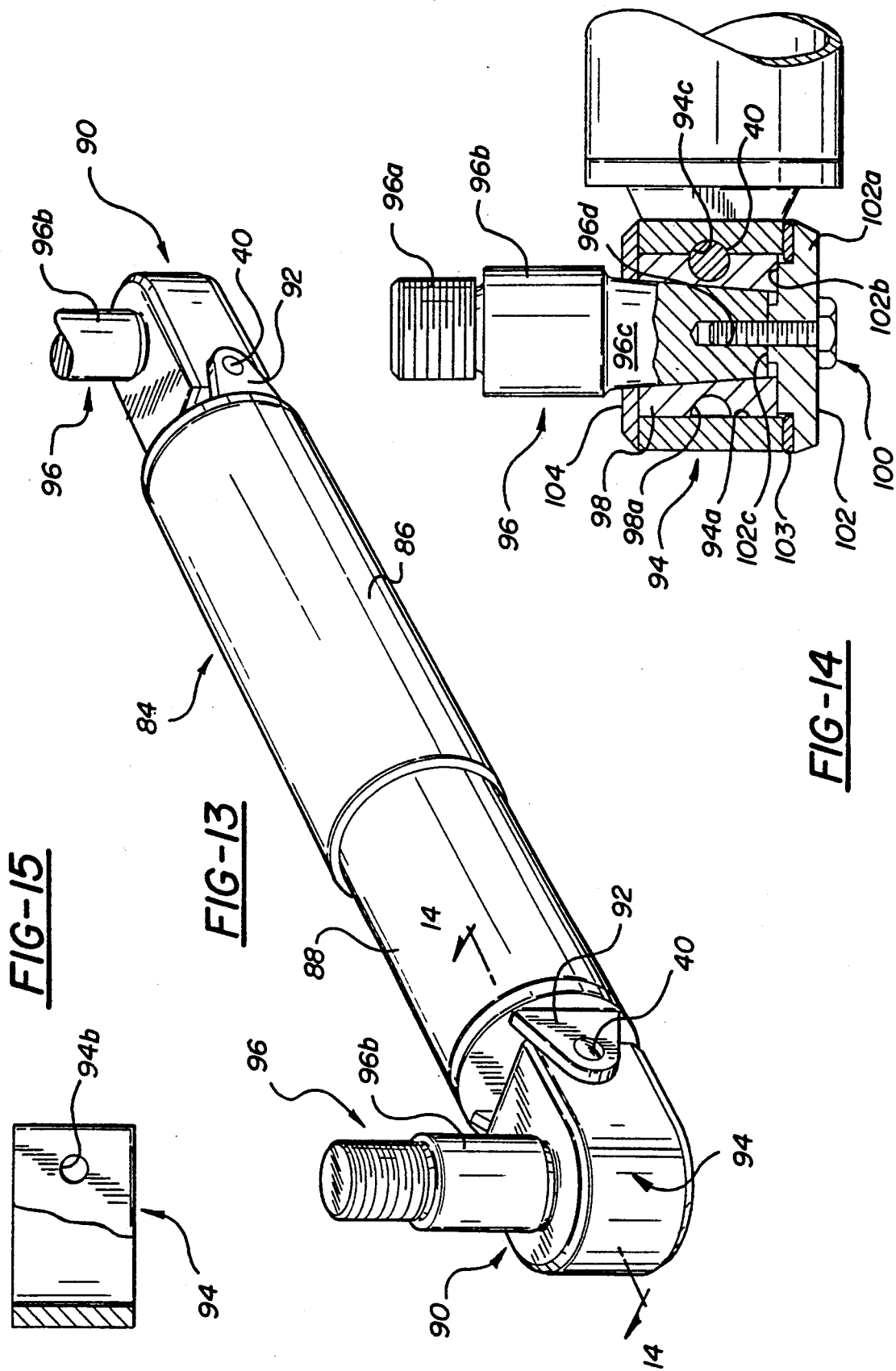

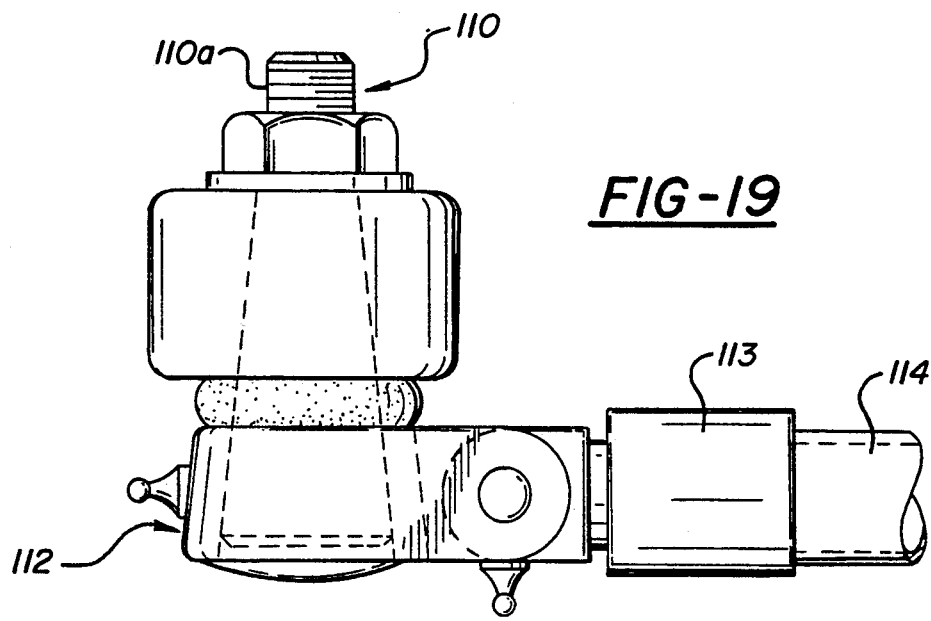
FIG-19
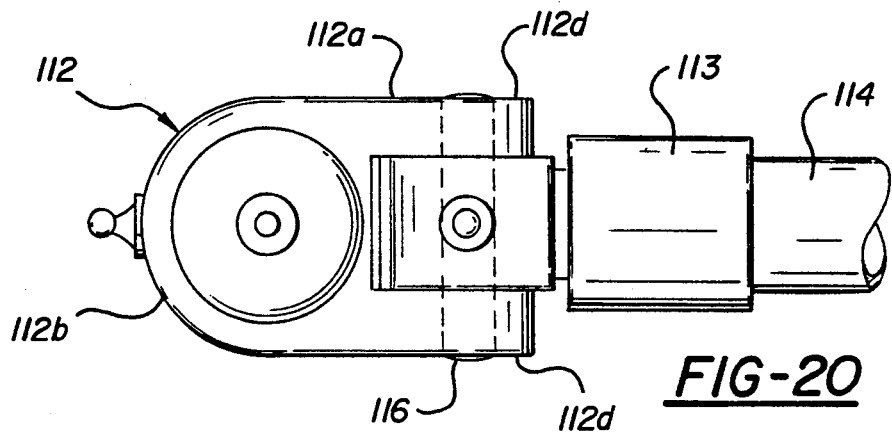
FIG-20
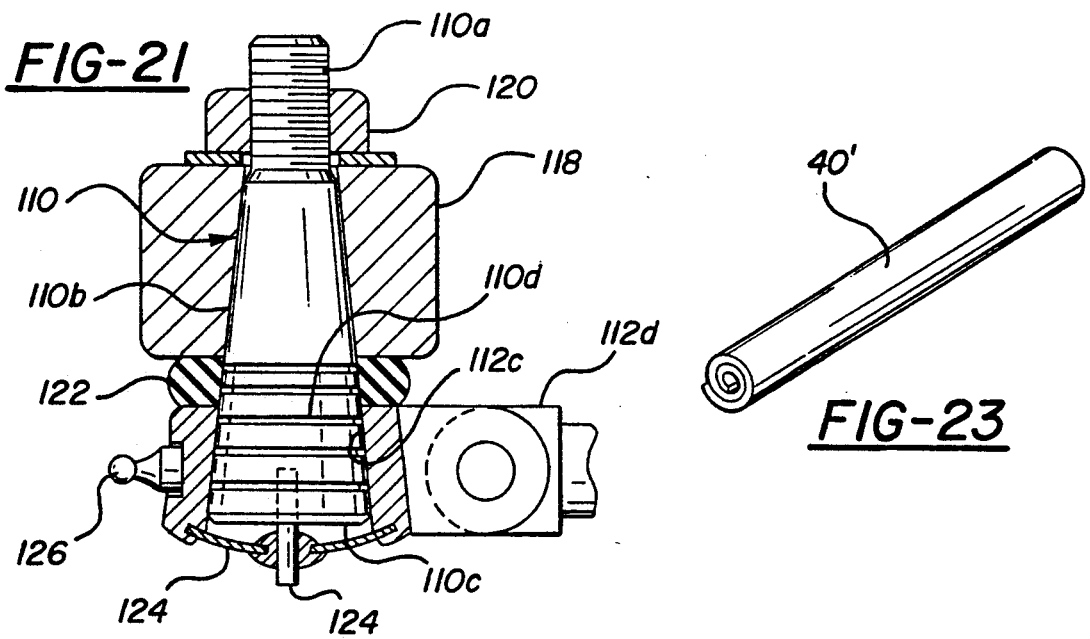
FIG-21
FIG-23

SELF-ALIGNING JOINT FOR LINKAGES

BACKGROUND OF THE INVENTION

This invention relates to self-aligning joints and to linkages employing self-aligning joints. Examples of linkages employing self-aligning joints include tie rod assemblies, drag link assemblies, torque rod assemblies, control rod assemblies, and many other applications in the automotive, agricultural, and industrial fields.

The most commonly used self-aligning joint is the ball and socket joint commonly called "ball joint." A ball joint generally consists of a mounting stud terminating in a ball and disposed within a socket and stem member such that the stud portion extends through an opening in the socket member which is smaller than the ball diameter. The ball has a slidable swiveling engagement with a conforming bearing surface in the socket. A preloading construction generally completes the joint assembly with the bearing surfaces in preloaded contact.

Three basic motions determine the amount of self-alignment which can be handled by a specific ball joint. The socket and stem member can be rotated freely around the axis of the ball stud, but the angular movement of the socket and stem in the plane of the ball stud axis is limited by interference between the opening in the socket and the ball stud. Excessive angulation can cam the ball through the opening in the socket body or break or bend the ball stud. To minimize the chance of "cam out" or stud breakage, the diameter of the ball stud can be reduced at the point of interference. This is common practice, but it reduces the load and fatigue limits of the ball stud.

The third motion of the ball joint is rotation about the axis of the socket and stem. This movement can create problems. For example, in some steering systems rotation about the socket stem axis due to the design geometry of the steering system is in the order of plus or minus 5°, occurring on a lock to lock turn of about 45°. Additionally, the common axle forgings can oscillate as much as plus or minus 25° metal to metal and this oscillation is superimposed on the design geometry oscillation. The resulting combined oscillation moves the socket body back and forth into contact with the ball stud and introduces a sense of lost motion and instability to the driver of the vehicle. Many proposals have been made to eliminate this third movement and create what is known as a "zero angle" ball joint. These proposals, however, are in general complicated and quite expensive.

Another major shortcoming of the ball joint is the difficulty in grease sealing. "Tent" type seals are the least expensive and are commonly used on automotive and agricultural applications. The seal fits snugly on the ball stud at the mounting surface and, upon installation of the joint, the seal is compressed against the exterior bowl of the socket body. The seal surface is a small annular band of contact which "gaps" with the large angular movements and, at best, grease retention is poor. It requires frequent greasing to purge contaminants and remain filled. The other type of seal is the bellows seal fitted and secured around both the ball stud and the bottom of the socket body. Angulation is handled well by the bellows except for large angulations which frequently pinch and rupture the bellows. The bellows is ruptured in many ways and its service life is seldom as long as the joint replacement. Power greasing systems fill so fast that the pressure relief cuts are insufficient and the seal blows off the socket body. At this point there is no effective sealing.

Ball joints are also very dependent on essentially perfect sphericity of the ball. The ball stud forging must be trimmed to eliminate heavy flash around the ball and the ball must then be burnished to obtain some degree of sphericity. At best, the ball is out of round. Under the heavy preloads required in ball stud assemblies, any variations in roundness imprints in plastic bearings resulting in initial lockup or very high breakaway steering torque.

SUMMARY OF THE INVENTION

This invention is directed to the provision of a self aligning joint that eliminates the design deficiencies of a ball joint.

More specifically, this invention is directed to the provision of an improved joint in which angulation of the stem member in the axial plane of the stud member is not restricted, thereby eliminating "cam out" and ball stud breakage.

This invention is further directed to the provision of an improved self-aligning joint wherein "zero angle" characteristics may be readily provided.

This invention is further directed to the provision of a self aligning joint which, when used on the opposite ends of the tie rod assembly of a motor vehicle, allows independent alignment of each wheel and eliminates the need to stock left and right-hand thread versions of the joint for use on the left and right ends of the tie rod assembly.

The invention self-aligning joint includes a stem; a clevis on one end of the stem defining a pair of spaced arms; a stud; a body member positioned between the clevis arms and defining a socket mounting one end of the stud for rotation about the axis of the stud; and means mounting the body member for angulation about an axis normal to the axes of the stem and the stud. This arrangement provides a simple self-aligning joint which provides free and complete angulation of the stud and further provides zero angle performance for the joint.

According to a further feature of the invention, the mounting means comprises an axle pin mounted at its opposite ends in the arms of the clevis and passing through the body member to mount the body member for angulation about the axis of the pin. This arrangement provides a simple and effective means of providing the required angulation of the body member and associated stud.

According to a further feature of the invention, the stud includes a circumferential groove proximate the end of the stud positioned in the socket of the body member and the axle pin includes an intermediate portion positioned in the stud groove. This arrangement allows the axle pin to further act as a means to preclude axle displacement of the stud out of the socket.

According to a further feature of the invention, the clevis may be mounted for rotation about the axis of the stem so as to provide oscillatory movement about the axis of the stem. This arrangement allows the joint to provide movement about a third axis when "zero angle" characteristics are not desired.

According to a further feature of the invention, the groove has a circular cross sectional configuration; the axle pin has a circular cross section; the body member defines a groove opening in the socket in alignment with the stud groove; and the pin intermediate portion is positioned in the stud groove and in the body member groove. This specific arrangement provides a total journal interface as between the pin, the body member, and the stud.

According to a further feature of the invention, the socket defines a cylindrical surface and the end of the stud received in the socket is cylindrical and is journaled in the socket on the cylindrical surface of the socket. This arrangement allows readily and inexpensively providable cylindrical surfaces to be utilized at the critical journaled interfaces of the joint.

The invention also provides an improved linkage utilizing the invention self-aligning joint concepts. The improved linkage includes an elongated tubular member; an elongated rod member rotatably mounted in the tubular member and including a free end portion projecting out of one end of the tubular member; a first body member defining a socket and mounted on the free end of the rod member for angulation about an axis normal to the axis of the rod member; a first stud member mounted at one end thereof in the socket of the first body member for rotation about an axis normal to the axis of the rod member and to the rotational axis of the body member; a second body member defining a socket and mounted for rotation on the other end of the tubular member for angulation about an axis normal to the axis of the tubular member; and a second stud mounted at one end thereof in the socket of the second body member for rotation about an axis normal to the axis of the tubular member and to the axis of rotation of the second body member. This arrangement provides a joint at each end of the linkage with freedom of movement about two axes and with a third freedom of movement provided by relative rotational movement between the tubular member and the rod member.

The invention further provides an improved linkage utilizing the invention self-aligning joints in conjunction with a piston and cylinder arrangement. Specifically, the linkage includes a hollow cylindrical member; a piston assembly mounted for rotational and linear movement in the cylinder member and including a piston rod extending out of the cylinder; a clevis on the free end of the piston rod and defining a pair of spaced arms; a stud; a body member positioned between the clevis arms and defining a socket mounting the stud for rotation about the axis of the stud; and means mounting the body member for angulation about an axis normal to the axes of the piston rod and the stud. This arrangement provides a piston and cylinder construction in association with joint providing two axes of freedom with relative rotation between the piston assembly and the cylinder providing a third axis of freedom for the linkage assembly.

In one embodiment of the piston and cylinder linkage assembly, the hollow cylindrical member and the piston assembly form a hydraulic cylinder assembly; the piston assembly further includes a piston mounted for rotational and linear movement in the cylinder member; and the piston rod is connected to the piston and extends out of the end of a cylinder member for connection at its free end to the clevis.

In another embodiment of the piston and cylinder linkage assembly, the hollow cylinder and the piston assembly form a shock absorber assembly with the cylindrical member and the piston rod constituting the inner and outer telescopically arranged members of the shock absorber.

The invention further provides an improved joint assembly. The improved joint assembly includes a support member; a stud having a circumferential groove proximate one end thereof; a body member defining a socket mounting the one end of the stud for rotation about the axis of the stud; and a pin supported by the support member, journaled in the body member to mount the body member for angulation about the pin axis, and including a portion positioned in the annular groove to preclude axial displacement of the stud out of the socket.

BRIEF DESCRIPTION OF THE DRAWINGS

FIG. 4 is a cross sectional view of the invention self aligning joint;

FIG. 5 is a bottom view of the invention self aligning joint;

FIG. 6 is a perspective view of the invention self aligning joint;

FIG. 7 is an exploded view of the invention self aligning joint;

FIGS. 8 is a detail view of a body member utilized in the invention self aligning joint;

FIG. 9 is a detail view of an alternate stem structure for use in the invention self aligning joint;

FIGS. 10, 11 and 12 are perspective and detail views of a hydraulic cylinder assembly employing self aligning joints according to the invention;

FIGS. 13 and 14 are perspective and detail views of a shock absorber assembly employing self aligning joints according to the invention;

FIGS. 15 is a detail view of a body member utilized in the shock absorber assembly of FIGS. 13 and 14;

FIG. 19-22 are top, elevational, and sectional views of an alternate form of the invention self aligning joint; and FIG. 23 is a perspective view showing an alternate axle pin structure for use in the invention self aligning joint.

DETAILED DESCRIPTION OF THE PREFERRED EMBODIMENTS

Figure 1:
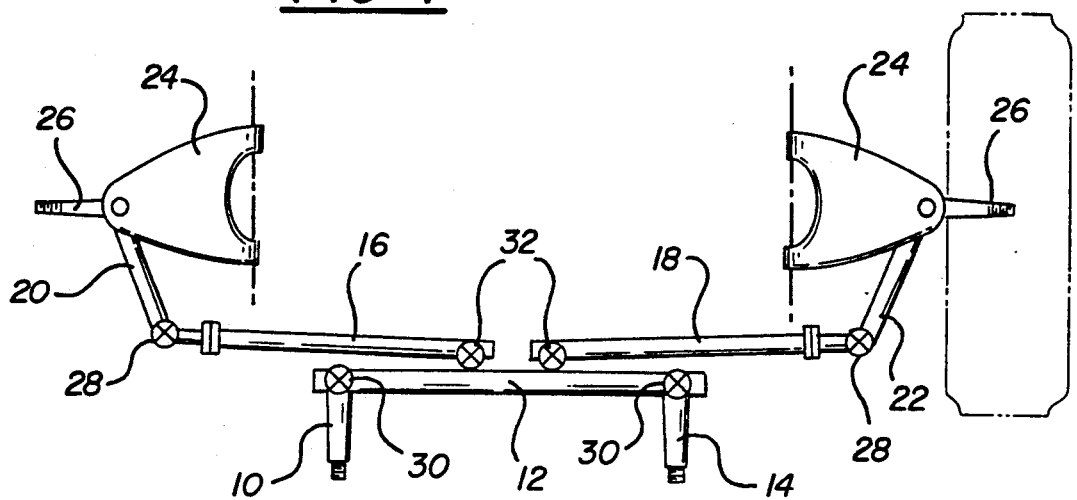
FIG. 1 is a schematic view of a motor vehicle steering linkage embodying self aligning joints according to the invention.
Figure 2:
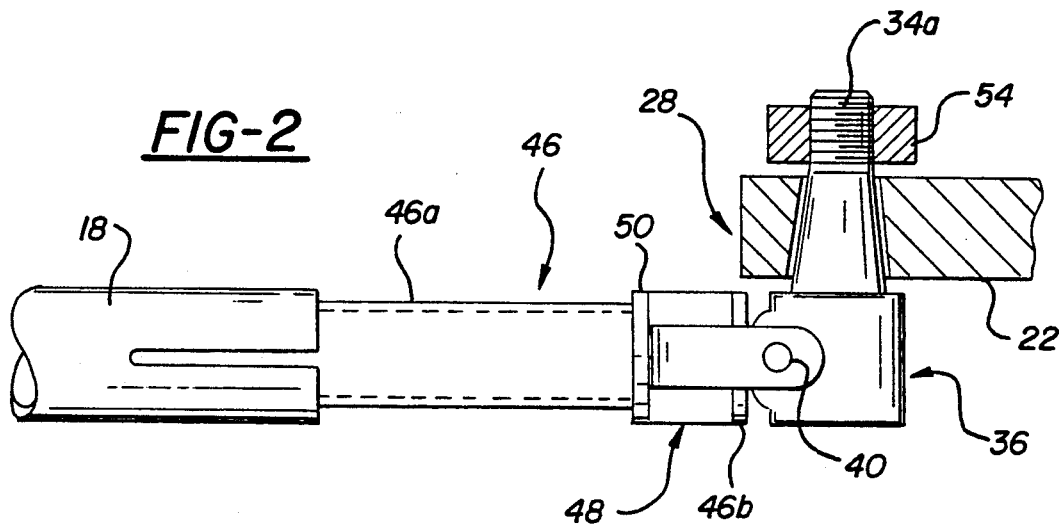
FIG. 2 is a fragmentary side view of a self aligning joint according to the invention shown in association with a tie rod tube.
Figure 3:
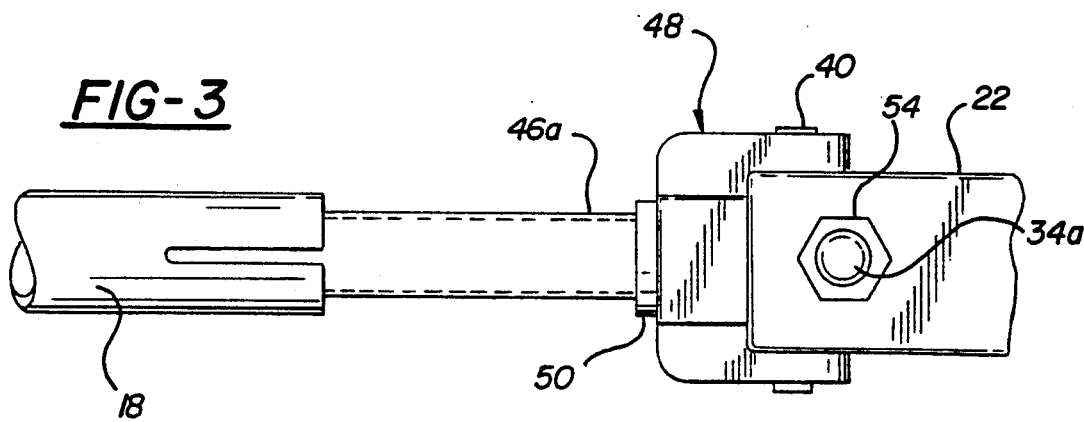
FIG. 3 is a top view corresponding to FIG. 2.
Figure 22:
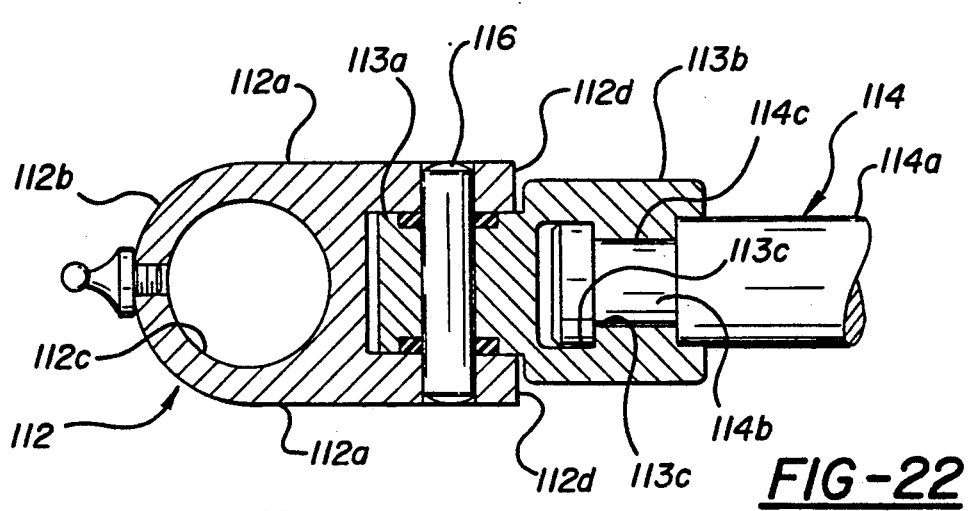

The invention self aligning joint is shown in FIG. 1 in association with a motor vehicle steering system of the pitman type including a pitman arm 10, a counter or cross link 12, an idler link 14, left and right tie rods 16 and 18, steering arms 20 and 22, upper control arms 24, and spindles 26. The various components of the steering system and typically connected together by joints 28, 30 and 32 which typically comprise ball joints of known construction. According to the invention, at least the ball joints 28 interconnecting the tie rods and the steering arms are replaced by a self aligning joint 28 according to the invention. It will be understood that any or all of the other joints 30 and 32 of the system might also be replaced by self aligning joints according to the invention.

The invention self aligning joint 28, broadly considered, includes a stud 34, a body member 36, a stem structure 38, and an axle pin 40. All of the parts are preferably formed of a ferrous material such as a suitable steel.

Stud 34 includes a cylindrical threaded end portion 34a, a frusto conical portion 34b, and a cylindrical end portion 34c. An annular circumferential groove 34d is provided in cylindrical end portion 34c in axially spaced relation to the lower end surface 34e of the stud.

Body member 36 is generally rectangular and includes a flat upper surface 36a, a flat lower surface 36b, flat side surfaces 36c, a flat rear surface 36d, and a rounded front surface 36e. A blind socket 36f, coaxial with the center of curvature of front surface 36e, opens in the upper face 36a of the body member and is defined at its blind lower end by the lower face or wall 36b of the body member. A rounded protuberance 36g extends across the rear face 36d of the body member and a bore 36h, coaxial with the center of curvature of protuberance 36g, extends through the body member and includes a portion 36i intermediate its ends opening in the socket 36f. Socket 36f defines a cylindrical surface slightly larger than the cylindrical surface of stud cylindrical portion 34c so as to allow the cylindrical portion 34c of the stud to be received with a journal fit in the socket 36f to allow rotation of the stud about the lengthwise axis 34f of the stud. Body member 36 further defines a counterbore 36j in upper face 36a at the upper end of socket 36f. A grease fitting 42 is provided in front wall 36e of the body member opening in cavity 36f to allow the delivery of lubricant to the cavity, and a lip seal 44 is seated in counterbore 36j to provide a lip seal 44a for wiping and sealing coaction with the cylindrical portion 34c of stud 34 with the stud portion 34c received in body member cavity 36f.

Stem structure 38 includes a stem 46 and a clevis 48.

Stem 46 includes a threaded end 46a, a headed end 46b, and a circumferential groove 46c between threaded end 46a and headed end 46b. Threaded end 46a is intended to be threadably received in threaded tie rod tube 18 in known manner.

Clevis 48 includes a central hub portion 48a and a pair of arms 48b. Arms 48b are spaced apart by a distance to accommodate body member 36 therebetween with body member side faces 36c in respective juxtaposition to the inboard faces of the respective arms 48b. Hub portion 48a defines a central opening 48c dimensioned to have a journal fit on the portion 46d of the stem 46 between groove 46c and headed end 46b. Hub portion 48a is thus journaled on stem 46 with one annular face 48d of the hub portion positioned against headed end 46b and the other annular face 48e of the hub portion positioned against a retaining clip 50 snappingly received in groove 46c. The hub 48 is thus free to move in an oscillatory manner about the axis of stem 46.

Axle pin 40 has a radius generally corresponding to the radius of annular groove 34d and bore 46h so that the pin may be positioned with its opposite ends 40a received in respective bores 48f in respective arms 48b and with its intermediate portion 40b passing through body member bore 36h and through stud groove 34d. Bore portion 36i and groove 34d coact to provide a complete journal interface as between the pin, the body member, and the stud. Axle pin 40 thus mounts the body member 36 for angulation about the axis 50 of the pin and further serves to preclude axial displacement of the stud out of the socket 36f. Axle pin 40 is preferably fixed at its ends 40a in bores 48f as by press fitting, spot welding, or a combination of both. The pin is thus non-rotatably mounted on the clevis, mounts the body member for angulation about the axis of the pin, precludes axial displacement of the stud out of the socket 36f, and does not interfere with the rotation of the stud about the stud axis 34f. Axle pin 40, as shown in FIG. 7, may be formed of solid rod stock or, alternatively, as shown in FIG. 23, may comprise a rolled pin formed of rolled sheet metal stock.

It will be understood that, in use as a replacement for the ball joint typically employed between the tie rods and the steering arms, stem 46 is threaded into the associated tie rod, the associated steering arm 22 is journaled on a conical tapered portion 34b of the stud, and a nut 54 is threaded onto stud threaded end 34a to securely position the steering arm on the stud. Thus associated with the tie rod and the steering arm, the invention self aligning joint allows rotational movement of the stud about the stud axis; allows angulation of the body member and stud about the axis of axle pin 40; and allows oscillation of the total joint assembly about the axis of stem 46.

The invention self aligning joint may also be readily adapted to a "zero angle" construction merely by replacing the two-part, relatively rotatable stem structure of FIGS. 1–8 with the one-part unitary stem structure 60 seen in FIG. 9. In stem structure 60, stem portion 60a is integral with clevis portion 60b to preclude oscillatory movement of the joint about the axis of the stem to thereby achieve a "zero angle" effect in applications where the third degree of movement is not required and/or desired.

As seen in FIGS. 10–12, the invention self aligning joint may also be used in combination with a hydraulic cylinder assembly 70 to provide a linkage assembly. The linkage assembly seen in FIGS. 10–12 includes a self aligning joint 72 according to the invention secured to the free end of the piston rod 74 of hydraulic cylinder assembly 70 and a further self aligning joint 72 according to the invention secured to the end of the cylinder member 76 of the hydraulic cylinder assembly remote from the end from which the piston rod 74 projects. Each joint 72 provides only two degrees of freedom with the third degree of freedom provided by relative rotation between the cylinder member 76 of the hydraulic cylinder assembly 70 and the piston 78 of the hydraulic cylinder assembly 70.

Each joint 72 includes a body member 36, a stud 34, an axle pin 40 and a clevis 80. Members 34, 36 and 40 correspond in all respects to the correspondingly numbered components in the FIGS. 1–8 embodiment of the invention and clevis 80 corresponds generally to clevis 48 of the FIGS. 1–8 embodiment with the exception that the hub portion 48a is replaced with the a clamp portion 80a so that the clamp portion 80a may be fitted over the free end of the piston rod 74 and clamped around the rod by the use of fasteners 82 whereby to secure the joint 72 securely to the free end of the piston rod and preclude oscillatory movement of the joint about the axis of the piston rod. As noted, oscillatory freedom of movement about the axis of the piston rod 74 is provided in the linkage of the FIGS. 10–12 embodiment by relative rotation between the piston 78 and cylinder member 76. Similarly, clamp portion 82a of the clevis 80 forming a part of the self aligning joint 72 secured to the cylinder member 76 serves to clamp the clevis and thereby the joint to the free end of a rod 76a forming a rigid extension of the cylinder member 76. Again, the joint has no freedom of oscillatory movement about the axis of the rod 76a but achieves freedom of oscillatory movement by virtue of relative rotation between the cylinder member 76 and piston 78.

The invention is illustrated in FIGS. 13-15 in association with a shock absorber 84 of known form and including an outer tubular member 86 telescopically receiving an inner tubular member 88 with the inner member 88 being free to move linearly and telescopically with respect to the outer member 86 in response to the application of a load to the shock absorber and with the inner tubular member 88 further being free to rotate relative to the outer tubular member 86. A self aligning joint 90 according to the invention is secured to the free end of inner tubular member 88 and a further self aligning joint 90 is secured to the closed end of the outer tubular member 86.

Each joint 90 provides two degrees of freedom with a third degree of freedom being provided by relative rotational movement between the inner and outer tubular members of the shock absorber.

Each joint 90 includes ears or lugs 92 secured to the free end of inner tubular member 88 or the closed end of outer tubular member 86; a pin 40 secured at its opposite ends in lugs 92; and a body member 94 of annular construction defining a cylindrical socket 94a. Body member 94 includes a bore 94b extending through the body member and including a central portion 94c opening in socket 94a and defining a journal interface with the central portion of pin 40. The stud of the self aligning joint 90 comprises a stud assembly including a stud 96a, cylindrical bushing or race 98, a screw bolt 100, and a washer 102. Stud 96 includes a threaded upper end portion 96a, a cylindrical intermediate portion 96b, and a tapered lower portion 96c defining a threaded downwardly opening central bore 96d. Tapered portion 96c is press fit in the inner bore of bushing or race 98 and bushing 98 is sized to be journaled in socket 94a and includes an annular circumferential groove 98a journaled around the central portion of pin 40. Washer 102 includes an outer annular portion 102a, an intermediate raised boss portion 102b, and a central raised boss portion 102d which is stepped above the upper face of boss portion 102b. Washer 102 is positioned against the underface of the joint by bolt 100 threaded into bore 96d with outer annular portion 102a positioned against the annular underface of body 94 via an elastomeric washer 103, raised boss portion 102b positioned against the annular underface of race 98, and central raised boss portion 102c positioned against the annular underface of stud 96. Washer 102 will be see to maintain a desired clearance between stud 96 and race 98 and preclude overtightening of race 98. If desired, a deflector 104 may be press fit on the upper end of stud taper portion 96c so as to close the upper end of the socket 94a with the stud assembly positioned within the socket 94. As noted, either joint 90 provides two degrees of freedom with the third degree of freedom (oscillatory movement abut the central axis of the shock absorber) being provided by relative rotational movement between the inner and outer tubular members of the shock absorber.

Figure 16:
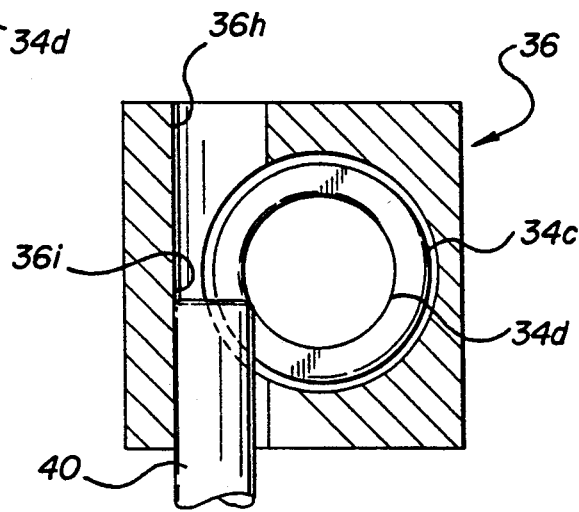
FIGS. 16, 17, and 18 are successive views showing the installation of an alternative axle pin configuration in the invention self aligning joint.
Figure 18:
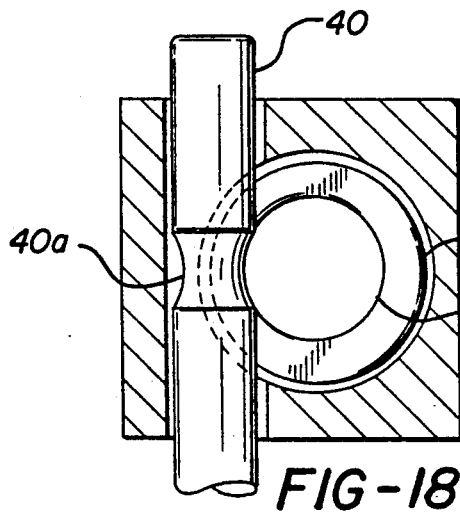
Figure 17:
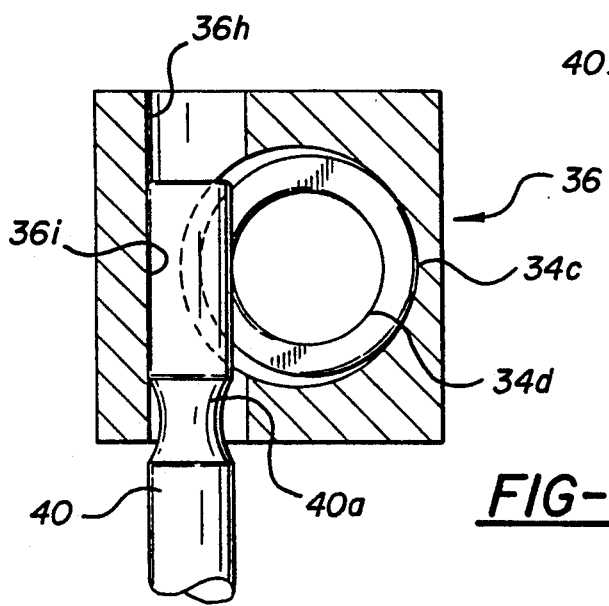

The embodiment of FIGS. 16-18 illustrates that the axle pin 40, rather than having a constant diameter throughout its length, may include an annular semi-circular groove defining a central reduced diameter portion 40a which may coact with the inner diameter of the annular groove 34d of the body member to preclude axial displacement of the pin. FIGS. 16, 17 and 18 illustrate, successively, the manner in which the pin may be inserted with elastic deformation and momentary bending of the parts occurring to allow insertion of the pin into the interlocking disposition shown in FIG. 18 where the pin is precluded from axial movement by the interlocking action between the pin and the stud.

A further embodiment of the invention self aligning joint is illustrated in FIGS. 19-22. The joint of FIGS. 19-22 includes a stud 110, a body member 112, a connector 113, a stem 114, and an axle pin 116.

Stud 110 includes an upper threaded portion 110a and a tapered portion 110b extending from the lower end of threaded portion 110a to the lower end 110c of the stud.

Body member 112 includes flat side faces 112a, a rounded front face 112b, a central conical through bore 112c concentric with rounded front face 112b, and a clevis portion constituted by a pair of spaced arms 112d.

Connector 113 includes a journal portion 113a and a socket portion 113b defining a socket 113c.

Stem 114 has a circular cross section and includes a main body portion 114a and a journal portion 114b.

In the assembled relation of the joint of FIGS. 19-22, the lower end of the tapered portion 110b of stud 110 is received in bore 112c with the upper end of the tapered portion projecting upwardly out of the bore; a steering arm or the like 118 is positioned on the upper end of stud tapered portion 110b, and a nut 120 is threaded onto upper threaded end 110a to clamp the steering arm between the nut and an elastomeric ring 122 positioned in surrounding relation to stud tapered portion 110b between the lower face of the steering arm and the upper face of body member 112; pin 116 passes through aligned bores in arms 112d and connector journal portion 113a to mount the connector for angulation about the axis of axle pin 116; stem journal portion 114b is journaled in socket 113c of connector journal portion 113b with an internal rib 113c on the connector journaled in a circumferential groove 114c in the stem journal portion to preclude axial displacement of the stem relative to the connector; a dished washer 124 closes the lower end of bore 112c with its annular edge received in an annular groove defined at the lower end of the body member 112; a wear indicator pin 124 secured to the lower end of stud 110 projects downwardly through a grommet seal carried by washer 124 to indicate the extent of wear of the joint; and a grease fitting 126 in body member 112 communicates with socket 112c and with lubricating grooves 110d provided on the lower end of stud taper portion 110b.

The invention self aligning joint and associated linkages will be seen to provide many important advantages. Specifically, the joint provides unrestricted angulation as opposed to the limited angulation provided in the prior art ball joint; the basic joint design readily lends itself to configuration as a "zero angle" joint with only two degrees of freedom or, alternatively, as a universal joint providing three degrees of freedom; the joint replaces the spherical joint interfaces of the typical ball joint with readily obtainable precision cylindrical fits and thereby eliminates all of the manufacturing problems inherent in attempting to achieve roundness of the ball and all of the operational and maintenance problems created by a lack of roundness of the ball; in the universal configuration including oscillation of the joint about the axis of the stem, the stem may be rotated independently of the joint so as to provide individual adjustments at either end of an associated linkage (such as a tie rod linkage) without disturbing the other elements of the assembly so that, for example, a single wheel alignment may be performed on a vehicle without any effect on the other wheel; the joint eliminates the need for the typical "turn buckle" linkage in the tie rod assembly and also the requirement to stock left and right threaded rod ends; the joint eliminates the need to reduce the diameter of the ball stud proximate the opening of the socket in the body member and thereby eliminates a common fatigue and failure mode of a ball joint; the joint design allows the use of simple and readily available commercial seals which provide long term grease retention and allow for complete immersion of the joint; and the joint design lends itself to various linkage assemblies wherein the third degree of freedom of movement of the assembly is provided by an associated piston and cylinder arrangement constituting a part of the linkage.

Whereas preferred embodiments of the invention have been illustrated and described in detail it will be apparent that various changes may be made in the disclosed embodiment without departing from the scope or spirit of the invention.

I claim:

1. A joint comprising:
   a stem structure including a stem member;
   a stud;
   a body member defining a socket mounting one end of said stud for rotation about the axis of the stud; and
   means, including a clevis mounted on the stem structure defining a pair of spaced arms and an axle pin mounted at its opposite ends in said clevis arms, for mounting the body member on the stem for angulation about an axis normal to the axes of said stem structure and said stud, intersecting the axis of the stem, and displaced laterally from the axis of the stud.

2. A joint according to claim 1 wherein said clevis forms a part of said stem structure and said pin includes an intermediate portion passing through said body member.

3. A joint according to claim 1 wherein said clevis forms a part of said body member and said pin includes an intermediate portion passing through said stem structure.

4. A joint according to claim 2 wherein said clevis is mounted on one end of said stem member for rotation about the axis of the stem member.

5. A joint comprising:
   a stem;
   a clevis on one end of said stem defining a pair of spaced arms;
   a stud;
   a body member positioned between said clevis arms and defining a socket mounting one end of said stud for rotation about the axis of the stud; and
   an axle pin having opposite ends in said arms, passing through said body member, and mounting said body member for angulation about the axis of the pin, the pin axis being perpendicular to the axes of said stud and said stem, intersecting the stem axis, and laterally displaced from the stud axis.

6. A joint according to claim 5 wherein said clevis is mounted for rotation on said stem so as to provide rotary movement about the axis of the stem.

7. A joint according to claim 5 wherein said socket defines a cylindrical surface and said one end of said stud is cylindrical and is journaled in said socket on said cylindrical surface.

8. A joint comprising:
   a stem;
   a clevis on one end of said stem defining a pair of spaced arms;
   a stud;
   a body member positioned between said clevis arms and defining a socket mounting one end of said stud for rotation about the axis of the stud; and
   means mounting said body member for angulation about an axis perpendicular to the axes of said stud and said stem;
   said mounting means comprising an axle pin mounted at its opposite ends in said arms and passing through said body member to mount the body member for angulation about the axis of the pin;
   said stud including a circumferential groove proximate said one end of said stud and positioned in said socket; and
   said axle pin including an intermediate portion positioned in said stud groove.

9. A joint according to claim 8 wherein said groove has a circular cross section; said pin has a circular cross section; said body member defines a groove opening in said socket in alignment with said stud groove; and said pin intermediate portion is positioned in said stud groove and in said body member groove.

10. A joint according to claim 9 wherein said clevis is mounted for rotation on said stem so as to provide oscillatory movement about the axis of the stem.

11. A joint comprising:
    a stem;
    a clevis on one end of said stem defining a pair of spaced arms;
    a stud having a circumferential groove proximate one end thereof;
    a body member positioned between said clevis arms and defining a socket mounting said one end of said stud for rotation about the axis of the stud; and
    an axle pin having opposite ends mounted in said clevis arms, passing through said body member to mount said body member for angulation about the pin axis, and including an intermediate portion positioned in said stud groove.

12. A joint according to claim 11 wherein said clevis is mounted for rotation on said stem so as to provide rotary movement about the axis of the stem.

13. A joint according to claim 11 wherein said groove has a circular cross section; said pin has a circular cross section; said body member defines a groove opening in said socket in alignment with said stud groove; and said pin intermediate portion is positioned in said stud groove and in said body member groove.

14. A joint according to claim 11 wherein said socket defines a cylindrical surface and said one end of said stud is cylindrical and is journaled in said socket on said cylindrical surface.

15. A joint comprising:
    a support member;
    a stud having an end portion of circular cross section and defining a circular circumferential groove in the end portion;
    a body member defining a socket of circular cross section having a diameter corresponding generally to the diameter of the end portion of the stud, said end portion of the stud being rotatably mounted in the socket to mount said stud for rotation in said socket about the axis of the stud and further defining a single continuous bore extending through the body member normal to the stud axis, intersecting said socket, and opening in said socket in alignment with said groove; and a pin supported at its opposite ends by said support member, journalled in said bore to mount the body member for angulation about the pin axis, and including a portion positioned in said annular groove to preclude axial displacement of said stud out of said socket while allowing rotation of the stud in the socket of the body member.

16. A joint according to claim 15 wherein said support member defines spaced arms; said body member is positioned between said arms; the opposite ends of said pin are mounted in said arms; and an intermediate portion of said pin is positioned in said groove.

17. A joint according to claim 15 wherein said stud groove has a circular cross section; said pin has a circular cross section; said bore includes an intermediate portion defining a circular groove opening in said socket in alignment with said stud groove; and said pin includes a portion journaled in said stud groove and said bore groove.

18. A joint comprising:

a stem including a stem member;

a stud;

a body member defining a socket mounting one end of said stud for rotation about the axis of the stud; and means, including a clevis defining a pair of spaced arms and an axle pin mounted at its opposite ends in said clevis arms mounting the body member on the stem for angulation about an axis normal to the axes of said stem structure and said stud;

said clevis forming a part of said stem structure and said pin including an intermediate portion passing through said body member;

said stud including a circumferential groove proximate said one stud end and positioned in said socket;

said intermediate portion of said pin passing through said stud groove.

* * * * *